United States Patent
Yang (10) Patent No.: US 7,816,889 B2
(45) Date of Patent: Oct. 19, 2010

(54) METHOD OF CHARGING RECHARGEABLE BATTERY AND PROTECTION CIRCUIT FOR RECHARGEABLE BATTERY

(75) Inventor: Jongwoon Yang, Yongin-si (KR)

(73) Assignee: Samsung SDI Co., Ltd., Gongse-dong, Giheung-gu, Yongin-si, Gyeonggi-do (KR)

(*) Notice: Subject to any disclaimer, the term of this patent is extended or adjusted under 35 U.S.C. 154(b) by 0 days.

(21) Appl. No.: 11/797,893

(22) Filed: May 8, 2007

(65) Prior Publication Data

US 2007/0257635 A1 Nov. 8, 2007

(30) Foreign Application Priority Data

May 8, 2006 (KR) .................. 10-2006-0041175

(51) Int. Cl.
*H02J 7/00* (2006.01)
(52) U.S. Cl. .......................................... 320/132
(58) Field of Classification Search ............. 320/132
See application file for complete search history.

(56) References Cited

U.S. PATENT DOCUMENTS

| | | | | |
|---|---|---|---|---|
| 5,422,559 | A * | 6/1995 | Hall et al. | 320/139 |
| 5,654,622 | A * | 8/1997 | Toya et al. | 320/129 |
| 6,492,792 | B1 * | 12/2002 | Johnson et al. | 320/136 |
| 7,365,515 | B2 * | 4/2008 | Takano et al. | 320/116 |
| 2005/0062459 | A1 | 3/2005 | Young et al. | |
| 2005/0088142 | A1 * | 4/2005 | Chen | 320/128 |

FOREIGN PATENT DOCUMENTS

| | | |
|---|---|---|
| CN | 1505236 | 6/2004 |
| EP | 0657983 A2 | 12/1994 |
| EP | 0856931 A2 | 8/1998 |
| JP | 02122722 | 5/1990 |
| JP | 09-298845 | 11/1997 |
| JP | 2000-316237 | 11/2000 |
| JP | 2004-349186 | 12/2004 |
| JP | 2005151697 | 6/2005 |
| JP | 2005176534 | 6/2005 |
| KR | 10-2004-0080907 A | 9/2004 |
| WO | 0042673 | 7/2000 |
| WO | 2007106715 A2 | 9/2007 |

* cited by examiner

*Primary Examiner*—Patrick J Assouad
*Assistant Examiner*—Samuel Berhanu
(74) *Attorney, Agent, or Firm*—Robert E. Bushnell, Esq.

(57) ABSTRACT

A method for charging a rechargeable battery, and a protection circuit for the rechargeable battery. The protection circuit perceives whether the battery is charged or not by sensing the voltage of the bare cell, changes the direct voltage applied between a gate electrode and a source electrode of a charging field effect transistor, which is connected in series between one terminal of the bare cell and one terminal of a charger, and controls the amount of the current flowing from the source electrode of the charging field effect transistor to a drain electrode at a low level, thereby maintaining a low charging rate of the battery.

14 Claims, 6 Drawing Sheets

METHOD OF CHARGING RECHARGEABLE BATTERY AND PROTECTION CIRCUIT FOR RECHARGEABLE BATTERY

CLAIM OF PRIORITY

This application makes reference to, incorporates the same herein, and claims all benefits accruing under 35 U.S.C. §119 from an application for METHOD OF CHARGING RECHARGEABLE BATTERY AND PROTECTION CIRCUIT FOR RECHARGEABLE BATTERY earlier filed in the Korean Intellectual Property Office on May 8, 2006 and there duly assigned Serial No. 10-2006-0041175.

BACKGROUND OF THE INVENTION

1. Field of the Invention

The present invention relates to a method for charging a rechargeable battery and a protection circuit for the rechargeable battery and, more particularly, to a pre-charge method capable of limiting the amount of electric current input through a charger at the initial stage of charging and a protection circuit for the rechargeable battery.

2. Discussion of Related Art

The process of charging and discharging a rechargeable battery, on the basis of the state of charge of the battery, is performed during the usage of the rechargeable battery, such as a lithium ion battery. Because energy is stored in batteries, if problems such as an internal short circuit occurs, ignition or explosion may occur as the stored energy is released in a short period of time. Particularly, in case of a lithium rechargeable battery, improving safety is increasingly needed because the energy density of the lithium rechargeable battery is high and non-aqueous electrolyte used in the lithium rechargeable battery is inflammable.

As a device for improving safety, a positive temperature coefficient thermister interrupting the current by monitoring the temperature change, or a circuit breaker using a bimetal, or a safety vent preventing the explosion by monitoring the internal pressure change, etc., may be used, and a protection circuit preventing overcharge is usually installed in the charger or the battery itself.

A protection circuit for the contemporary rechargeable battery is typically constructed with a bare cell, a charging field-effect transistor (hereinafter, referred to as "FET") which is connected with in series the bare cell and which is turned off in case of overcharging and overdischarging, a discharging field-effect transistor, a fuse that breaks the circuit when the internal temperature exceeds a certain value, a sensor register sensing the current of the bare cell, a main control circuit generating various control signals by integrating electrical signals from the bare cell and the sensor register, a first protection circuit either turning on or turning off the charging FET or the discharging FET, and a second protection circuit connected to the fuse via the main control circuit and either turning on or turning off a short circuit preventing FET. The bare cell is a battery in a state where a cap assembly is coupled with a can into which an electrode assembly is inserted. In other words, the bare cell shows the state of the rechargeable battery before the rechargeable battery is formed as a cylindrical type battery pack, or an angular type battery pack, or a pouch type battery pack. All constituent elements are build into a single battery pack. An external charger may charge the rechargeable battery, and an external driving load may be connected to the battery when the rechargeable battery is discharged.

In the protection circuit for the contemporary rechargeable battery, when the bare cell is overcharged, the sensor register senses the state of overcharging and outputs certain electrical signals to the main control circuit. The main control circuit outputs control signals to the first protection circuit. And then, the first protection circuit turns off the charging FET by applying low signals to the gate electrode of the charging FET, and charging of the battery is therefore stopped.

In case that the bare cell is over-discharged, discharging of the battery is stopped by turning off the discharging FET through a similar control path as described above.

In case that the internal temperature of the rechargeable battery rises due to the occurrence of an abnormal state such as internal short circuit, an ignition and explosion of the rechargeable battery are prevented by activating the second protection circuit connected to a temperature sensitive fuse. The temperature sensitive fuse may melt when the temperature rises to a certain level, thus cutting off the current flowing into the circuit.

Meanwhile, the charger usually provides constant charging current at the initial stage of charging and constant voltage at the latter period of charging. For the lithium rechargeable battery, if constant charging current at the initial stage of charging is provided, the internal structure of a negative electrode active material inside the battery might be destroyed and lifetime of the battery might be reduced because the current value will rise to exceed an appropriate level. To resolve these problems, at the initial stage of charging, the charging FET is turned off, a pre-charging FET and a posister, that is, a positive temperature coefficient thermister, are installed in a bypass circuit to induce the charging current. And the charging current, which flows through the pre-charging FET, is limited within an range by the resistance of the posister, so that the charging current does not deleteriously effect the rechargeable battery electrode structure.

After a certain time passes, or when the voltage of the rechargeable battery bare cell reaches a certain level, and the pre-charging FET is turned off and the charging FET is turned on by adjusting the gate voltage to induce the charging current.

In the contemporary protection circuit, however, costs of the posister and the pre-charging FET of the bypass circuit are high, thereby increasing the cost of a protection circuit board and the manufacturing cost of the rechargeable battery.

SUMMARY OF THE INVENTION

It is therefore an object of the present invention to provide an improved method for charging a rechargeable battery and an improved protection circuit for the rechargeable battery.

It is another object to provide a method for charging a rechargeable battery and a protection circuit for the rechargeable battery, which are able to control the initial charging current at a low level without the use of the pre-charging FET and the posister in the bypass circuit in the contemporary protection circuit.

To achieve these and other objects, the method for charging the rechargeable battery according to the principles of the present invention includes perceiving whether the battery is charged or not by the protection circuit which senses the voltage of a bare cell, maintaining a low charging rate by the protection circuit which changes a direct voltage applied between a gate electrode and a source electrode of a charging FET, and controlling the amount of the current flowing from the source electrode to a drain electrode of the charging FET at a low level. The charging FET is installed in series between one terminal of the bare cell and one terminal of the charger.

Here, in order to change the direct voltage applied between the gate electrode and the source electrode of the charging FET in the step of maintaining the low charging rate, it is possible to change the direct voltage by controlling a duty ratio of a pulse width modulation (PWM) signal.

Following the step of maintaining a low charging rate, the protection circuit may perform a step of detecting a voltage increase. When the protection circuit perceives that the bare cell terminal voltage is above a certain level, the protection circuit may perform a step of maintaining a high charging rate which allows more charging current than during the step of maintaining a low charging rate to flow through the FET by applying a higher voltage than during the step of maintaining a low charging rate, to the source electrode of the charging FET.

Alternatively, following the step of maintaining a low charging rate, the protection circuit may perform a step of perceiving passage of time. When the protection circuit perceives the passage of a certain time, the protection circuit may perform a step of maintaining a high charging rate which allows more charging current than that in the step of maintaining a low charging rate to flow through the FET by applying higher voltage than that in the step of maintaining a low charging rate, to the source electrode of the charging FET.

Here, in the steps of maintaining a high charging rate, the protection circuit may change the direct voltage applied between the gate electrode and the source electrode of the charging FET by controlling the duty ratio of the PWM signal.

Alternatively, following the step of maintaining a low charging rate and the step of perceiving passage of time, the protection may perform a step of normal charging by applying 'low' signal to the gate electrode of the charging FET by a normal-charge driver of the protection circuit to turn on the charging FET.

The controlling of the charging rate control may be achieved by controlling the duty ratio of the pulse as well as by controlling the degree of the voltage.

Meanwhile, the protection circuit for the rechargeable battery of the present invention for achieving the above described aspect is constructed with a charging FET in which the drain electrode of the charging FET is electrically connected with the bare cell and the source electrode of the charging FET is electrically connected with a charger; a smoothing circuit filtering a signal applied to the source electrode of the charging FET; a pulse generating device electrically connected to the smoothing circuit and providing pulses to the smoothing circuit periodically; and a protection circuit electrically connected to the pulse generating device and provided with a pre-charge driver changing the duty ratio of the periodic pulse signal.

The protection circuit may further include a normal-charge driver, which is electrically connected to the gate electrode of the charging FET and either turning on or turning off the charging FET.

A second diode may be connected between the gate electrode of charging FET and the normal-charge driver to interrupt the current flowing toward the charging FET.

The smoothing circuit may include a first resistor connected to the source electrode of the charging FET in series, a capacitor connected to the first resistor in parallel, a first diode connected between the pulse generating device and the gate electrode of the charging FET to interrupt the current from the pulse generating device to the gate electrode of the charging FET, and a second resistor connecting the point in which the first resistor is connected with the first diode and the pulse generating device.

The charging FET may be made as a P-channel FET.

A third resistor may be connected between the source electrode and the gate electrode of the charging FET.

A fourth resistor may be connected between the second diode and the gate electrode of the charging FET.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE PREFERRED EMBODIMENTS

Hereinafter, the present invention will be described in detail with reference to the drawings.

Figure 1:
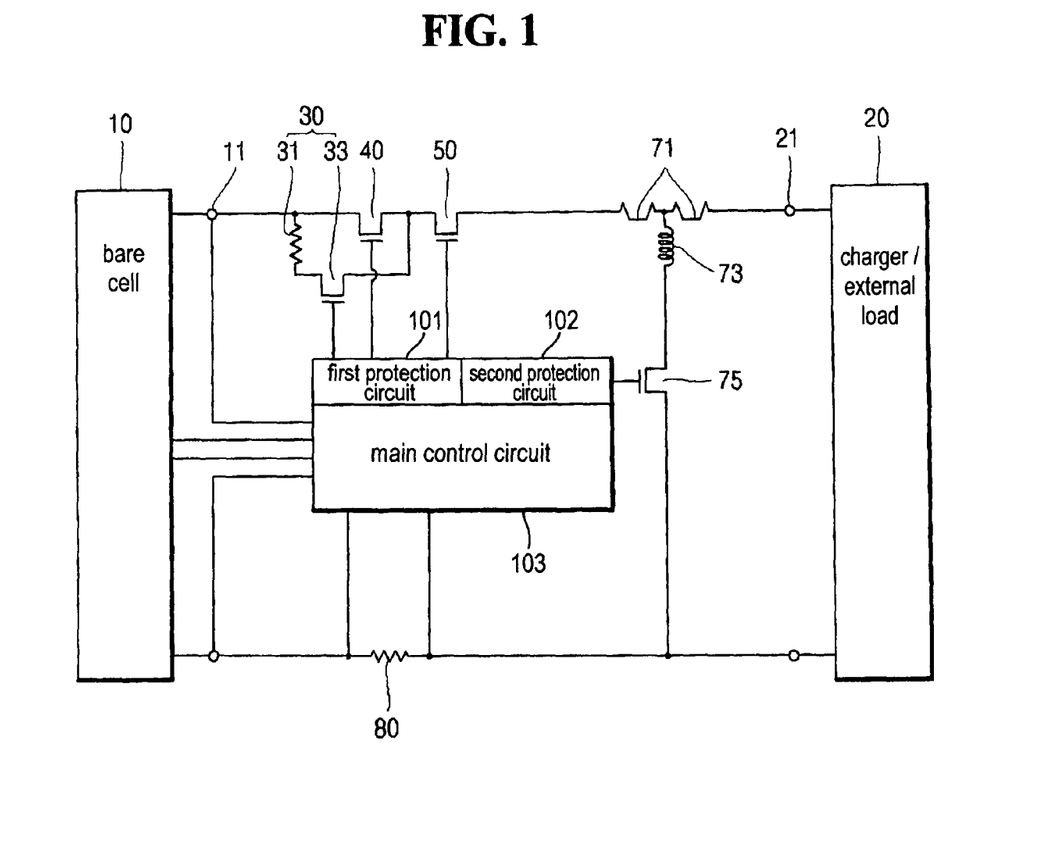
FIG. 1 is a block diagram illustrating a protection circuit for contemporary rechargeable battery.

FIG. 1 is a block diagram schematically illustrating a protection circuit for the contemporary rechargeable battery.

As shown in the drawing, a protection circuit for the contemporary rechargeable battery is constructed with a bare cell 10, a charging field-effect transistor (hereinafter, referred to as "FET") 40 connected 10 in series with bare cell, which is either turned on for charging bare cell 10 or turned off in case of overcharging and overdischarging, a discharging field-effect transistor 50 for discharging bare cell 10, a fuse 71 that breaks the circuit when the internal temperature exceeds the preset value, a sensor register 80 for sensing the current of bare cell 10, a main control circuit 103 for outputting various control signals by integrating electrical signals from bare cell 10 and sensor register 80, a first protection circuit 101 for either turning on or turning off charging FET 40 and discharging FET 50, and a second protection circuit 102 connected to fuse 71 via main control circuit 103 for determining whether to turn on or turn off a short-circuit preventing FET 75. All constituent elements are constructed within a single battery pack. Reference numeral 20 may represent a charger charging the rechargeable battery or an external load driven by the battery as the rechargeable battery is discharged.

In the protection circuit for the contemporary rechargeable battery, when bare cell 10 is overcharged, sensor register 80 senses the state of overcharging and outputs certain electrical signals to main control circuit 103. Main control circuit 103 outputs control signals to first protection circuit 101. Subsequently, first protection circuit 101 turns off charging FET 40 by applying low signals to the gate electrode of charging FET 40, and charging of the battery is therefore stopped.

In case that bare cell 10 is over-discharged, the discharging of the battery is stopped by turning off discharging FET 50 through a similar control path as described above.

In case that the internal temperature of the rechargeable battery rises due to the occurrence of an abnormal state such as internal short circuit and so on, an ignition and explosion of the rechargeable battery are prevented by activating second protection circuit 102 connected to a temperature sensitive fuse 71. Temperature sensitive fuse 71 may melt when the temperature rises to a certain level due to a high current flowing through temperature sensitive fuse 71, and thus cutting off the current flowing into the circuit.

Meanwhile, charger 20 usually provides constant charging current at the initial stage of charging and constant charging voltage at the latter period of charging. For the lithium rechargeable battery, if the constant charging current at the initial stage of charging is provided, the internal structure of a negative electrode active material located within the battery might be destroyed and the lifetime of the battery might be reduced because the current value will rise to exceed an appropriate level. To resolve these problems, at the initial stage of charging, charging FET 40 is turned off, a pre-charging FET 33 and a posister 31, i.e., a positive temperature coefficient thermistor, are installed in a bypass circuit 30 to flow the charging current. Since posister 31 has a positive temperature coefficient, the resistance value of posister 31 is small at low temperatures and increases as the temperature rises. Therefore, the current, which flows through pre-charging FET 33, is limited by the resistance of posister 31 within a range, so that the current does not deleteriously effect the rechargeable battery electrode structure.

After a certain time passes, or when the voltage of rechargeable battery bare cell 10 reaches a certain level, pre-charging FET 33 is turned off by adjusting the gate electrode voltage of pre-charging FET 33 and charging FET 40 is turned on to allow the charging current to flow.

In the contemporary protection circuit, however, costs of posister 31 and pre-charging FET 33 of bypass circuit 30 are high, thereby increasing the cost of the protection circuit board and the manufacturing cost of the rechargeable battery.

Figure 2:
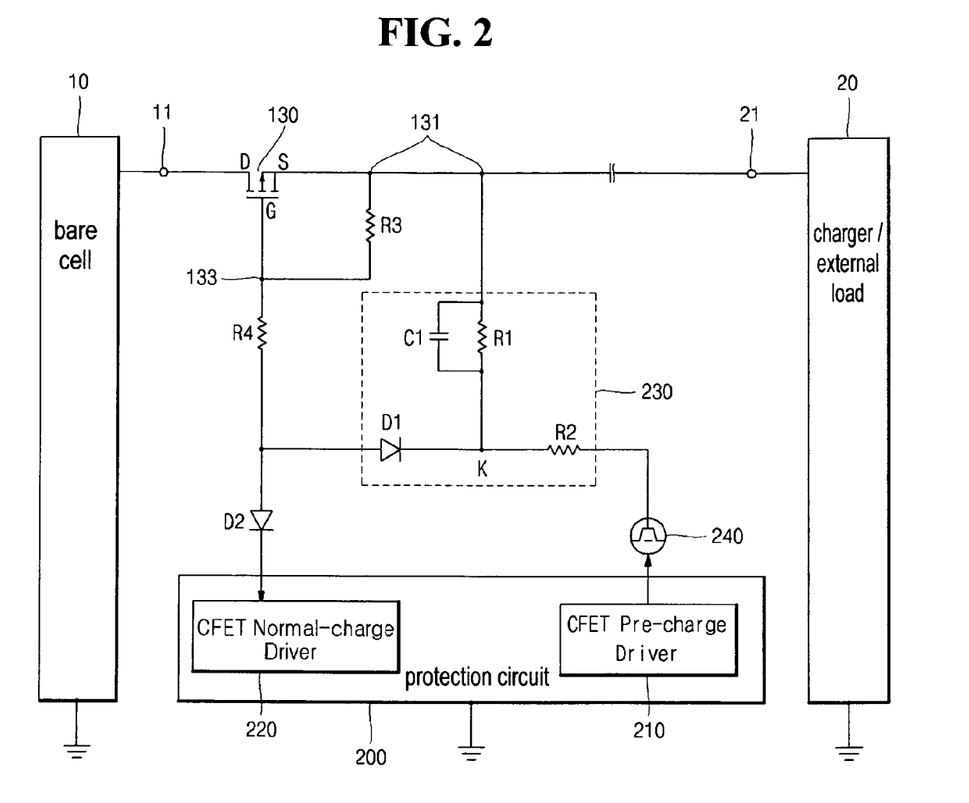
FIG. 2 is a block diagram illustrating main parts of a protection circuit for a rechargeable battery according to the principles of the present invention.
Figure 3:
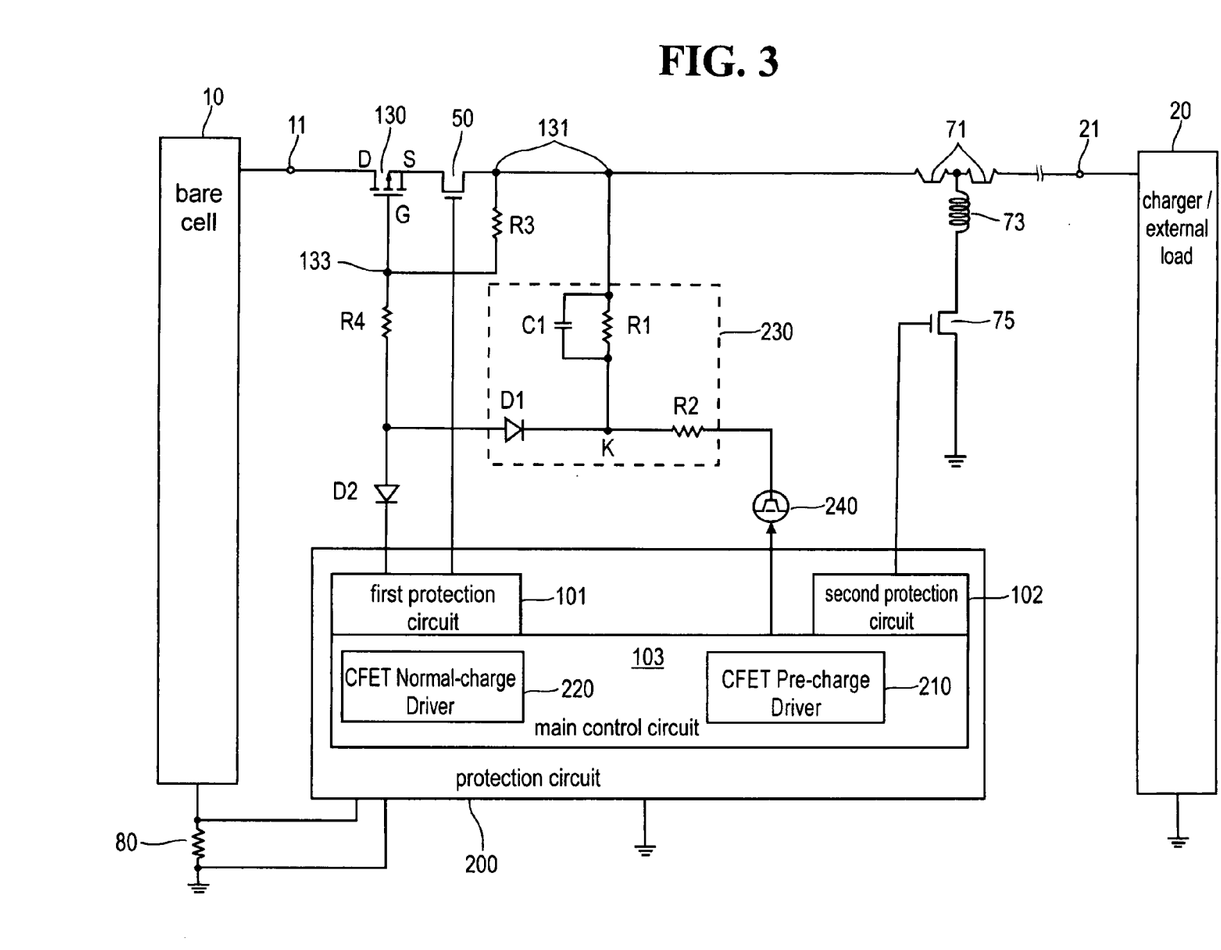
FIG. 3 is a block diagram illustrating the protection circuit for the rechargeable battery according to the principles of the present invention.

FIG. 2 is a block diagram illustrating the structure of main parts of a protection circuit according to an exemplary embodiment of the principles of the present invention; FIG. 3 is a block diagram illustrating the structure of a protection circuit according to an exemplary embodiment of the principles of the present invention. Hereinafter, when it comes to compare with the contemporary battery, common parts have the same reference numerals in FIG. 1. For explaining the embodiment associated with the present invention, only a charging FET 130, a protection circuit 200 and a surrounding circuit, which are electrically connected to a first connecting terminal 11 connected to bare cell 10 and a second connecting terminal 21 connected to charger 20, are described in FIG. 2. Here, bare cell 10, charger 20, and protection circuit 200 form a ground part in common.

Referring to FIG. 2, the rechargeable battery protection circuit device of the present invention may include a charging FET 130, a smoothing circuit 230, a pulse generating device 240 and a protection circuit 200.

Drain electrode D of charging FET 130 is electrically connected with bare cell 10 and source electrode S is electrically connected with charger 20. According to the surrounding construction of charging FET 130, drain electrode D of charging FET 130 is connected with first connecting terminal 11 of bare cell 10 and source electrode S of charging FET 130 is connected with second connecting terminal 21 of charger 20. In other words, charging FET 130 is connected in series between first connecting terminal 11 of bare cell 10 and second connecting terminal 21 of charger 20. Here, charging FET 130 may be formed as a P-channel FET, and may be turned on when a "Low" signal of approximately 0 V or a negative voltage is applied to gate electrode G.

Smoothing circuit 230 filters the signal applied to source electrode S of charging FET 130. Smoothing circuit 230 may be constructed with a first resistor R1 which is connected in series to source electrode S of charging FET 130, a capacitor C1 which is connected to first resistor R1 in parallel, a first diode D1 which is connected in series between pulse generating device 240 and gate electrode G of charging FET 130 for interrupting the current flowing from pulse generating device 240 to gate electrode G of charging FET 130, and a second resistor R2 connected between node K, to which first diode D1 and first resistor R1 are connected, and pulse generating device 240. This smoothing circuit 230 receives a pulse width modulation (PWM) signal supplied from pulse generating device 240 at second resistor R2, and the signal is filtered by first resistor R1 and capacitor C1. Therefore, smoothing circuit 230 filters alternating voltage off the PWM signal, which is a periodic alternating signal generated form pulse generating device 240, thus converting the PWM signal to a direct voltage, and applies the converted direct voltage to source electrode S of charging FET 130.

Pulse generating device 240 is electrically connected to smoothing circuit 230 to provide pulses periodically. This pulse generating device 240 may be integrally formed with protection circuit 200 and provide a pulse width modulation (PWM) signal to smoothing circuit 230.

Protection circuit 200 may further include pre-charge driver 210 electrically connected with pulse generating device 240. Pre-charge driver 210 of protection circuit 200 may alter the pulse generating period of the PWM signal generated from pulse generating device 240 by controlling the duty ratio of the PWM signal. The duty ratio is defined as the time period of the positive portion of the signal in one cycle to the time period of the entire circle. A multitude of terminals are installed in protection circuit 200, and they are connected with bare cell 10, sensor register 80, the gate electrode of discharging FET 50, and the gate electrode of short-circuit preventing FET 75 associated with the opening of temperature sensitive fuse 71 in FIG. 1. As shown in FIG. 3, dividing protection circuit 200 in further detail, protection circuit 200 may be composed of a main control circuit 103 outputting various control signals by integrating electrical signals from bare cell 10 and sensor register 80, a first protection circuit 101 either turning on or turning off charging FET 130 and discharging FET 50 by means of main control circuit 103, and a second protection circuit 102 either turning on or turning off short-circuit preventing FET 75 by means of main control circuit 103. When short-circuit preventing FET 75 is turned on, a high current is induced into fuse 71 and thus melts fuse 71. When fuse 71 melts, an open circuit is created, and the current flowing into the circuit is cut off. Main control circuit 103, first protection circuit 101 and second protection circuit 102 are closely connected to each other via a signal wire in protection circuit 200. This main control circuit 103 may be formed as a microcomputer with built-in programs. The microcomputer may further include first and second protection circuits 101 and 102. These built-in programs may have a signal generating program capable of producing a periodic signal generated from pulse generating device 240, i.e., the PWM signal generated from pulse generating device 240. Here, pre-charge driver 210 formed in main control circuit 103 may change the duty-ratio of the PWM signal.

Main control circuit 103 of protection circuit 200 may further include a normal-charge driver 220 to either turn on or turn off charging FET 130, which is electrically connected to gate electrode G of charging FET 130, as normal-charge driver 220 drives first protection circuit 101. This normal-charge driver 220 turns on charging FET 130 by applying 0 V or negative voltages when normal-charge driver 220 returns to the normal charge mode after pre-charging bare cell 10 by pre-charge driver 210. Therefore, bare cell 10 may be charged with the normal current.

A third resistor R3 may be connected between source electrode S and gate electrode G of charging FET 130. This third resistor R3 maintains the voltage difference between source electrode S and gate electrode G. Therefore, the initial current between source electrode S and gate electrode G can be matched.

The current flowing from normal-charge driver 220 of protection circuit 200 to charging FET 130 may be interrupted by second diode D2 which is connected between gate electrode G of charging FET 130 and normal-charge driver 220. This second diode D2 prevents normal-charge driver 220 form being malfunctioned by blocking the current from normal-charge driver 220 into gate electrode G of charging FET 130.

A fourth resistor R4 may be connected between second diode D2 and gate electrode G of charging FET 130. This fourth resistor R4 renders gate electrode G of FET 130 to be insensitive in response to the "Low" signal of approximately 0V or negative voltage which is supplied by normal-charge driver 220.

According to the rechargeable battery protection circuit with the above-described structure, when pulse generating device 240 applies the PWM signal to charging FET 130 and voltage Vgs between gate electrode G and source electrode S of charging FET 130 becomes 0 V, the current is not supplied into source electrode S and gate electrode G of charging FET 130 and therefore, the current through charging FET 130 converges to 0 and charging FET 130 is turned off. Also, direct voltage Vs of source electrode S of charging FET 130 is controlled by pre-charge driver 210 controlling the duty ratio of the PWM signal generated from pulse generating device 240 when normal-charge driver 220 maintains a high-signal and thus charging FET 130 is not turned off. This direct voltage Vs controlling method converts the PWM signal generated from pulse generating device 240 into the direct voltage by the function of smoothing circuit 230 to filter alternating voltage. Here the direct voltage Vs changes as a function of the duty ratio when pre-charge driver 210 controls the duty ratio of the PWM signal. Therefore, when potential difference between gate electrode G and source electrode S changes, the current flowing from source electrode S to drain electrode D changes in response to the changing voltage values of gate electrode G and source electrode S. That is, low current may flow from source electrode S to drain electrode D by reducing the value of direct voltage Vg applied to source electrode S. Therefore, it is possible to pre-charge bare cell 10 as the current flowing from source electrode S to drain electrode D is lower than that of the normal charge.

Figure 4:
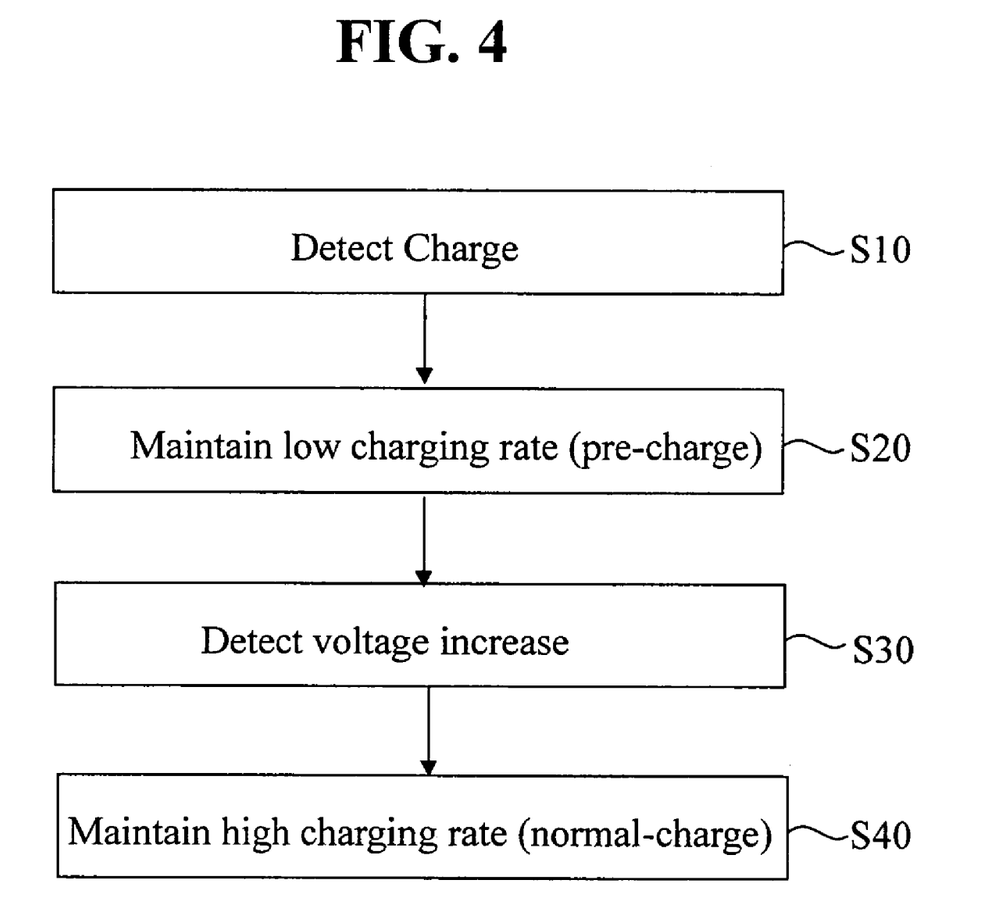
FIG. 4 is a flow chart of a method for charging a rechargeable battery according to a first embodiment of the principles of the present invention.

FIG. 4 illustrates a flow chart of charging process of the rechargeable battery according to a first embodiment of the principles of the present invention. The charging process of the rechargeable battery may include a step of detecting charge (S10) and a step of maintaining a low charging rate (S20).

In the step of detecting charge (S10), protection circuit 200 detects whether the initial charge is obtained or not by sensing the terminal voltage of bare cell 10. The method for sensing the terminal voltage of bare cell 10 may be performed by measuring the terminal voltage of bare cell 10 by a voltage comparator (not shown) built in protection circuit 200. Alternatively, it is possible to detect whether the initial charge is obtained or not by sensing the impedance of bare cell 10.

In the step of maintaining a low charging rate (S20), protection circuit 200 controls the amount of the current flowing from source electrode S to drain electrode D of charging FET 130 to be at a low level by adjusting the direct voltage applied between gate electrode G and source electrode S of charging FET 130, which is installed in series between bare cell 10 and charger 20.

After going through the step of detecting charge (S10) and the step of maintaining a low charging rate (S20), there is no need to install pre-charging FET 33 or posister 31, which is installed in the contemporary bypass circuit 30 to maintain a low current when charging bare cell 10, and therefore the number of parts mounted on the circuit can be reduced.

In the step of maintaining a low charging rate (S20), there are a multitude of methods controlling the direct voltage applied between gate electrode G and source electrode S. Here, in case of changing the direct voltages respectively applied to gate electrode G and source electrode S of charging FET 130 to maintain low charging rate, it is possible to control the direct voltages respectively applied to gate electrode G and source electrode S of charging FET 130 more precisely by controlling the duty ratio of the PWM signal in which the alternating voltage is filtered and applying the filtered signal to charging FET 130. In the embodiment of the above described device, pulse generating device 240 generates the pulse with a maximum value of approximately 12.6 V. Thus, when the duty ratio is 70%, the voltage of approximately 8 V is applied to source electrode S, and thus the amount of the current corresponding to 8 V flows from source electrode S to drain electrode D. Therefore, it is possible to control the current flowing from source electrode S to drain electrode D more precisely if the direct voltage is controlled by controlling the duty ratio.

Following the step of maintaining a low charging rate (S20), a step of detecting a voltage increase (S30) and a step of maintaining a high charging rate (S40) may be performed.

In the step of detecting a voltage increase (S30), protection circuit 200 perceives whether the terminal voltage between the positive and negative electrodes of bare cell 10 is above a certain level or not.

In the step of maintaining a high charging rate (S40), protection circuit 200 makes the amount of the current flowing through charging FET 130 more than the amount of the current flowing through charging FET 130 in the step of maintaining a low charging rate (S20), by applying a relatively high direct voltage Vs to source electrode S of charging FET 130. Here, the method for changing the direct voltage applied between source electrode S to drain electrode D of charging FET 130 may be performed by increasing the amount of the current flowing from source electrode S to drain electrode D of charging FET 130 to the amount of the current adequate for the normal charge by applying the PWM signal, in which the alternating voltage is filtered, to source electrode S of charging FET 130 and by controlling the duty ratio of the PWM signal to be 95%. Here, the PWM signal may be converted into the direct voltage by the filtering function of smoothing circuit 230.

Therefore, in the first embodiment of the present invention, by performing steps S10 through S40, bare cell 10 is first connected with charger 20 and is protected by charging bare cell 10 with low current through the pre-charging step (S20), and the normal charge is achieved through the step of maintaining a high charging rate (S30) when the voltage of bare cell 10 rises above a certain level.

Figure 5:
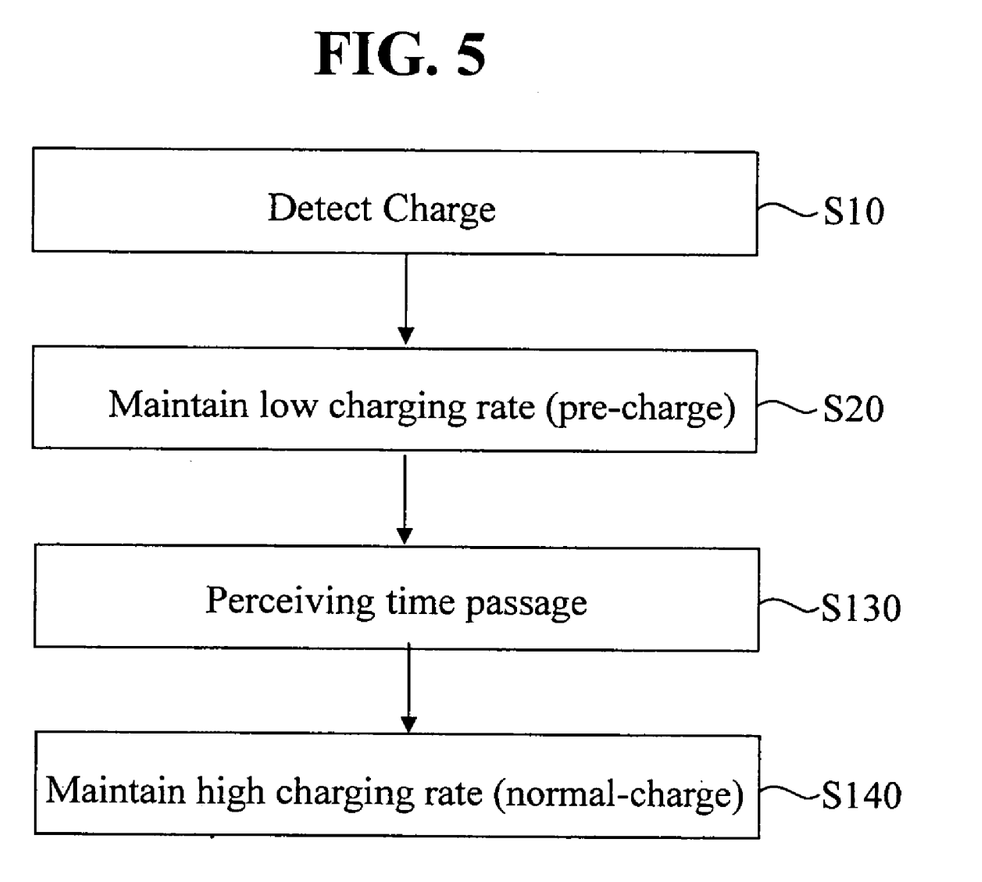
FIG. 5 is a flow chart of a method for charging a rechargeable battery according to a second embodiment of the principles of the present invention.

Alternatively, in a second embodiment of the present invention, following the step of maintaining a low charging rate (S20), a step of perceiving passage of time (S130) and a step of maintaining a high charging rate (S140) may be performed as illustrated in FIG. 5.

In the step of perceiving passage of time (S130), protection circuit 200 perceives the passage of a certain time after bare cell 10 is charged by the initial pre-charge charging.

The step of maintaining a high charging rate (S140) is performed after the step of perceiving passage of time (S130). In the step of maintaining a high charging rate (S140), protection circuit 200 makes the amount of the current flowing through charging FET 130 more than the amount of the current flowing through charging FET 130 in the step of maintaining a low charging rate (S20), by applying relatively high direct voltage, which is higher than the direct voltage in the step of maintaining a low charging rate, to source electrode S of charging FET 130. This step of maintaining a high charging rate (S140) is the same as the step of maintaining a high charging rate (S40) shown in the first embodiment, and thus further description is omitted.

By going through the step of perceiving passage of time (S130) and the step of maintaining a high charging rate (S140), the amount of the current flowing from source electrode S to drain electrode D of charging FET 130 is limited to the permitted amount of charge because protection circuit 200 determines on the basis of the elapsed time from when bare cell 10 contacts with first connecting terminal 11, when excessive current flows due to bad connection between bare cell 10 and first connecting terminal 11. Therefore, the bare cell will not degrade and protection circuit 200 will not break down due to the excessive current.

Figure 6:
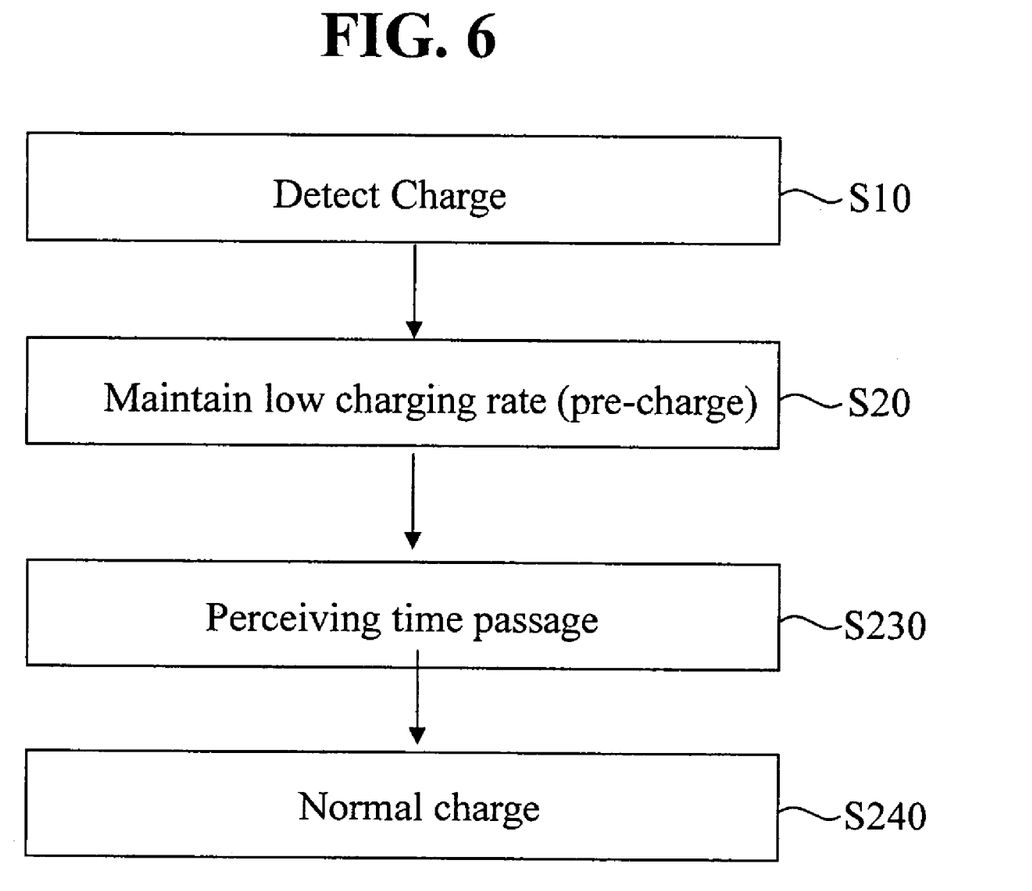
FIG. 6 is a flow chart of a method for charging a rechargeable battery according to a third embodiment of the principles of the present invention.

Alternatively, in a third embodiment of the present invention, following the step of maintaining a low charging rate (S20), a step of perceiving passage of time (S230) and a step of normal charge (S240) may be performed as illustrated in FIG. 6.

In the step of perceiving passage of time, protection circuit 200 perceives the passage of the certain time by the program built in protection circuit 200, after bare cell 10 is precharged.

In the step of normal charge, normal-charge driver 220 turns on charging FET 130 by applying a low signal of 0 V or negative voltage to gate electrode G of charging FET 130 by means of the program built-in protection circuit 200. When charging FET 130 is turned on by normal-charge driver 220, the amount of the current adequate for the normal charging flows, and thus the bare cell 10 is normally charged.

According to the principles of the present invention, it is possible to reduce the manufacturing costs of the rechargeable battery or the rechargeable battery protection circuit by performing the pre-charging for preventing the life of the battery from being reduced without the need to install the pre-charging FET or the posister in a bypass circuit.

What is claimed is:

1. A method of charging a rechargeable battery including a bare cell and a charging component through which current can flow to charge the bare cell, the method comprising:
   determining a charge state of the bare cell across terminals of the bare cell; and
   controlling a charging current flowing through the charging component to be at a first relatively low level during a pre-charging phase and at a second higher level during a charging phase, in dependence on the determined charge state, with the step of controlling the charging current flowing through the charging component comprising the steps of:
   electrically connecting a charging field effect transistor between a terminal of the bare cell and a terminal of a charger, with the charging field effect transistor comprising a drain electrode electrically connected to the terminal of the bare cell, a source electrode electrically connected to the terminal of the charger, and a gate electrode;
   controlling a duty ratio of a pulse width modulation signal generated by a pulse generating device;
   filtering the alternating voltage of the pulse width modulation signal; and
   applying the filtered signal to the source electrode of the charging field effect transistor to control the amount of charging current flowing from the source electrode to the drain electrode of the charging field effect transistor.

2. The method of charging a rechargeable battery as claimed in claim 1, further comprising:
   detecting a voltage increase of the bare cell to determine whether a terminal voltage of the bare cell is above a threshold level; and
   in the event that the terminal voltage is above the threshold level, switching the charging current to the second higher level.

3. The method of charging a rechargeable battery as claimed in claim 1, further comprising:
   switching the charging current to the second higher level after a predetermined period of time at the first relatively low level.

4. The method of charging a rechargeable battery as claimed in claim 1, with the step of controlling the current to be at the second higher level comprising applying a relatively high voltage between the gate electrode and the source electrode of the charging field effect transistor to induce more charging current flowing through the charging field effect transistor, the charging current flowing through the charging field effect transistor being more than the first relatively low charging current, and the voltage applied to the gate electrode of the charging field effect transistor being higher than the voltage applied to provide the first relatively low current.

5. The method of charging a rechargeable battery as claimed in claim 4, with the step of applying a relatively high voltage between the gate electrode and the source electrode of the charging field effect transistor comprising controlling the duty ratio of the pulse width modulation signal, filtering the alternating voltage of the pulse width modulation signal and applying the filtered signal to the source electrode of the charging field effect transistor.

6. The method of charging a rechargeable battery as claimed in claim 1, with the step of controlling the charging current to be at the second higher level comprising normally charging the bare cell by an normal-charge driver which turns on the charging field effect transistor by applying a low signal to the gate electrode of the charging field effect transistor.

7. A protection device for a rechargeable battery comprising:
   a bare cell;
   a charging field effect transistor comprising a drain electrode electrically connected with the bare cell and a source electrode electrically connected with a charger;
   means for determining a charge state of the bare cell across terminals of the bare cell;

a smoothing circuit for filtering a pulse width modulation signal and applying the filtered signal to the source electrode of the charging field effect transistor;

a pulse generating device electrically connected to the smoothing circuit to provide the pulse width modulation signal to the smoothing circuit periodically; and a protection circuit electrically connected to the pulse generating device and provided with a pre-charge driver for changing the duty-ratio of the periodic pulse signal generated by the pulse generating device.

8. The protection device for a rechargeable battery as claimed in claim 7, with the protection circuit comprising a normal-charge driver electrically connected to a gate electrode of the charging field effect transistor to either turn on or turn off the charging field effect transistor.

9. The protection device for a rechargeable battery as claimed in claim 8, further comprising a second diode connecting in series between the gate electrode of the charging field effect transistor and the normal-charge driver to interrupt the current flowing from the normal-charge driver to the charging field effect transistor.

10. The protection device for a rechargeable battery as claimed in claim 9, comprising a fourth resistor connected between the second diode and the gate electrode of the charging field effect transistor.

11. The protection device for a rechargeable battery as claimed in any one of claims 7, and 8 to 10, with the smoothing circuit comprising:

a first resistor connected to the source electrode of the charging field effect transistor in series;

a capacitor connected to the first resistor in parallel;

a first diode connected between the pulse generating device and the gate electrode of the charging field effect transistor to interrupt the current from the pulse generating device to the charging field effect transistor; and a second resistor connected between the point in which the first resistor is connected with the first diode and the pulse generating device.

12. The protection device for a rechargeable battery as claimed in any one of claims 7, and 8 to 10, with the charging field effect transistor comprising a P-channel field effect transistor.

13. The protection device for a rechargeable battery as claimed in any one of claims 7, and 8 to 10, comprising a third resistor connected between the source electrode and the gate electrode of the charging field effect transistor.

14. A method for charging a rechargeable battery including a bare cell and a charging component through which current can flow to charge the bare cell, the method comprising:

determining a charge state of the bare cell across terminals of the bare cell; and controlling a charging current flowing through the charging component in dependence on the determined charge state, with the step of controlling the charging current flowing through the charging component comprising the steps of:

electrically connecting a charging field effect transistor between a terminal of the bare cell and a terminal of a charger, with the charging field effect transistor comprising a first principal current conducting electrode electrically connected to the terminal of the bare cell, a second principal current conducting electrode electrically connected to the terminal of the charger, and a gate electrode;

controlling a duty ratio of a pulse width modulation signal generated by a pulse generating device;

filtering an alternating voltage of the pulse width modulation signal; and applying the filtered signal to the second principal current conducting electrode of the charging field effect transistor to control the amount of charging current flowing from the second principal current conducting electrode to the first principal current conducting electrode of the charging field effect transistor.

* * * * *